United States Patent [19]

Odet

[11] Patent Number: 5,076,453  
[45] Date of Patent: Dec. 31, 1991

[54] TAMPERPROOF CAP

[75] Inventor: Philippe Odet, Chasselay, France

[73] Assignee: Astra Plastique, Saint Georges de Reneins, France

[21] Appl. No.: 357,343

[22] Filed: May 25, 1989

[30] Foreign Application Priority Data

May 30, 1988 [FR] France ................... 88 07578

[51] Int. Cl.⁵ .......................................... B65D 41/34
[52] U.S. Cl. ............................................... 215/252
[58] Field of Search ........................ 215/250, 252, 320

[56] References Cited

U.S. PATENT DOCUMENTS

| 3,556,338 | 1/1971 | Wilkinson et al. | 215/320 |
|---|---|---|---|
| 4,493,427 | 1/1985 | Wolkonsky | 215/252 |
| 4,511,053 | 4/1985 | Brandes et al. | 215/252 |
| 4,530,437 | 7/1985 | Gray et al. | 215/252 |
| 4,643,321 | 2/1987 | Gach | 215/252 |
| 4,679,696 | 7/1987 | Bonnenfant et al. | 215/252 |
| 4,709,824 | 12/1987 | Thompson | 215/DIG. 1 |
| 4,775,064 | 10/1988 | Baxter | 215/252 |
| 4,793,506 | 12/1988 | Thompson | 215/DIG. 1 |
| 4,872,304 | 10/1989 | Thompson | 215/DIG. 1 |

FOREIGN PATENT DOCUMENTS 2290364 7/1979 France .

Primary Examiner—Stephen Marcus  
Attorney, Agent, or Firm—Herbert Dubno; Andrew M. Wilford

[57] ABSTRACT

A closure for a recipient having an upwardly open annular neck centered on an axis and formed with an external attachment formation and an axially downwardly projecting shoulder has a unitary one-piece cap formed of a relatively soft synthetic resin and a unitary one-piece tamper-resistant ring formed of a relatively hard synthetic resin. The cap itself is formed with an end sealingly fittable over the neck and an annular skirt projecting axially from the end and formed internally with an attachment formation complementary to that of the neck. The skirt has remote from the end a rim and is formed between the rim and the end with a radially inwardly open groove. The tamper-resistant ring is formed with an annular upper part having an outwardly projecting ridge normally seated in the groove of the skirt, an annular lower part having an inwardly projecting lip fitting axially under the shoulder of the neck, and a relatively fragile web axially joining the unitarily formed with both parts.

4 Claims, 2 Drawing Sheets

TAMPERPROOF CAP

FIELD OF THE INVENTION

The present invention relates to a tamperproof cap, that is a cap that cannot be opened and resealed without leaving proof of such original opening.

BACKGROUND OF THE INVENTION

It is standard to provide a recipient, hereinafter referred to as a bottle, with a cap that is constructed so that once it is sealed the cap can only be removed by permanently damaging or deforming an element of the closure, thereby signaling to the consumer that the package has been tampered with. Such an arrangement is particularly needed on a screw-type closure that could otherwise be reclosed and appear to never have been opened in the first place.

A standard such configuration has a cap formed as an internally threaded cup having a rim connected via a low-strength integral web with a so-called tamper ring. The ring is provided with a sawtooth formation or lip directed upward toward the cap and is molded as a single unitary element with the cap. In such an arrangement once the assembly is screwed down over the opening of the bottle the sawtooth formation or lip snaps into a groove and strongly blocks reverse upward displacement of the cap. Thus when the cap is screwed off the frangible web connecting the cap to the ring ruptures, leaving behind the desired evidence that the container has been opened.

The main difficulty with such an arrangement is that several different needs must be satisfied by the material of the closure. The cap must seal tightly, the ring must hold solidly on the bottle, and the frangible web must resist enough to avoid damage prior to assembly, must be readily severable by the consumer, and must not deform enough to move off the bottle without permanent damage. It is therefore necessary to trade off the various advantages and disadvantages against one another. The result is therefore an assembly made of a resin that is not well adapted to all the tasks at hand. In addition when the ring and cap are unitary they must be of the same color, making it impossible to use differently colored rings and caps to distinguish different products or just for design purposes.

In French patent 7,439,911 I describe a system with a cap that is separate from the tamper ring. Here the tamper ring snaps into an inwardly open groove in the cap in the same manner it snaps into an outwardly open groove in the bottle neck. Between the two ends of the ring, one end fixed axially in the cap and the other on the bottle by their respective sawtooth formations or lips, the ring is formed with a frangible web intended to rupture, leaving half the ring on the cap and half on the bottle when the closure is first opened. In this arrangement the cap is made of a rigid synthetic resin such as high-density polyethylene and the ring is made of a more supple resin, such as low-density polyethylene so that it can be torn easily.

Such an arrangement overcomes some of the disadvantages of the one-piece system, but has been found not to be applicable to certain products. Medicines in particular must often be packed extremely tightly, so that the cap must include a relatively soft plug that will seal the bottle hermetically. Such a closure therefore has three parts and is so expensive to manufacture, requiring a removable-core mold, that it can only be used with relatively expensive products.

OBJECTS OF THE INVENTION

It is therefore an object of the present invention to provide an improved tamperproof cap.

Another object is the provision of such an improved tamperproof cap which overcomes the above-given disadvantages, that is which can be produced cheaply yet will be as good as the above-described three-piece cap.

SUMMARY OF THE INVENTION

A closure for a recipient having an upwardly open annular neck centered on an axis and formed with an external attachment formation and an axially downwardly projecting shoulder according to this invention has a unitary one-piece cap formed of a relatively soft synthetic resin and a unitary one-piece tamper-resistant ring formed of a relatively hard synthetic resin. The cap itself is formed with an end sealingly fittable over the neck and an annular skirt projecting axially from the end and formed internally with an attachment formation complementary to that of the neck. The skirt has remote from the end a rim and is formed between the rim and the end with a radially inwardly open groove. The tamper-resistant ring is formed with an annular upper part having an outwardly projecting ridge normally seated in the groove of the skirt, an annular lower part having an inwardly projecting lip fitting axially under the shoulder of the neck, and a relatively fragile web axially joining and unitarily formed with both parts.

Thus the ring can be snapped up (It being understood that terminology with respect to the vertical is used herein only for convenience's sake and that the system works in any orientation.) into the groove of the skirt to form a closure that has the advantage of a relatively soft cap that can itself be formed as a plug. In addition the hard ring can be of a different color for design or identification purposes, and can be counted on to fracture rather than deform elastically when the closure is first opened.

The skirt according to this invention is formed adjacent its rim with a plurality of angularly spaced and radially inwardly projecting tabs axially downwardly delimiting the groove of the skirt and defining axially inwardly open gaps. In addition the attachment formations are both screwthreads and the cap is formed of a low-density polyethylene and the ring of a high-density polyethylene.

The cap according to this invention is formed in a mold comprising an outer part formed with an inner surface complementary to an outer surface of the end and skirt, a core having an end surface complementary to an inner surface of the cap end, an inner sleeve surrounding the core and having an outer surface complementary to the screwthread, an outer sleeve surrounding the inner sleeve and formed with an outwardly projecting ridge complementary to the groove of the skirt and with a plurality of axially projecting teeth, and a stripping plate surrounding the outer sleeve and having a surface complementary to the rim of the skirt.

The method of making the cap of this invention comprises the steps of first putting the part, core, sleeves, and plate together to form a cavity corresponding to the shape of the cap and injecting a hardenable synthetic resin into this cavity. Then the outer part is displaced axially away from the core, sleeves, and stripping plate and the core is displaces axially oppositely to the outer part away from the sleeves and stripping plate. Subsequently the inner sleeve is simultaneously rotated and axially displaced while holding the outer sleeve stationary to screw the inner sleeve out of the cap formed in the cavity while retaining the cap in the cavity against rotation by engagement of the teeth in the cap. Finally the stripping plate and outer sleeve are relatively axially displaced to push the cap off the outer sleeve.

The resultant cap can be made at very low cost, yet will seal as well as the expensive three-piece cap of the prior art. The use of two different resins, with the softer one used in the cap, allows these parts to be maximized for their particular functions and colored different, if desired. This cap can be produced cheaply enough for mass-consumption items like mineral water.

DESCRIPTION OF THE DRAWING

The above and other objects, features, and advantages will become more readily apparent from the following, reference being made to the accompanying drawing in which.

SPECIFIC DESCRIPTION

Figure 1:
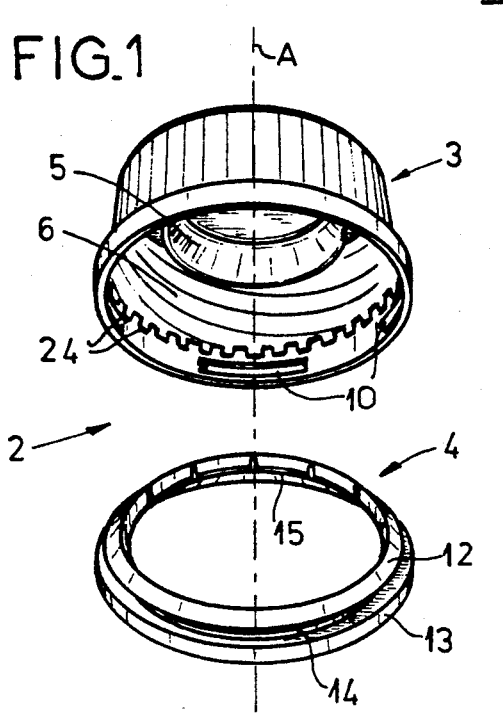
FIG. 1 is a perspective exploded view of the cap and locking ring according to this invention.
Figure 2:
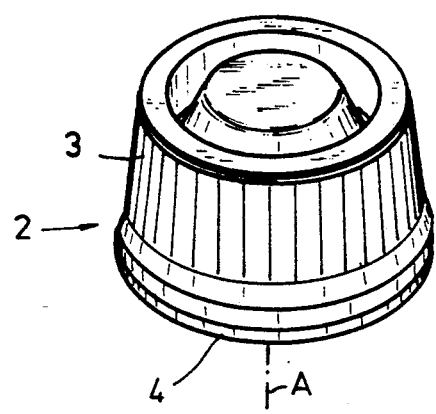
FIG. 2 is a perspective view of the assembled cap and ring of this invention.
Figure 3:
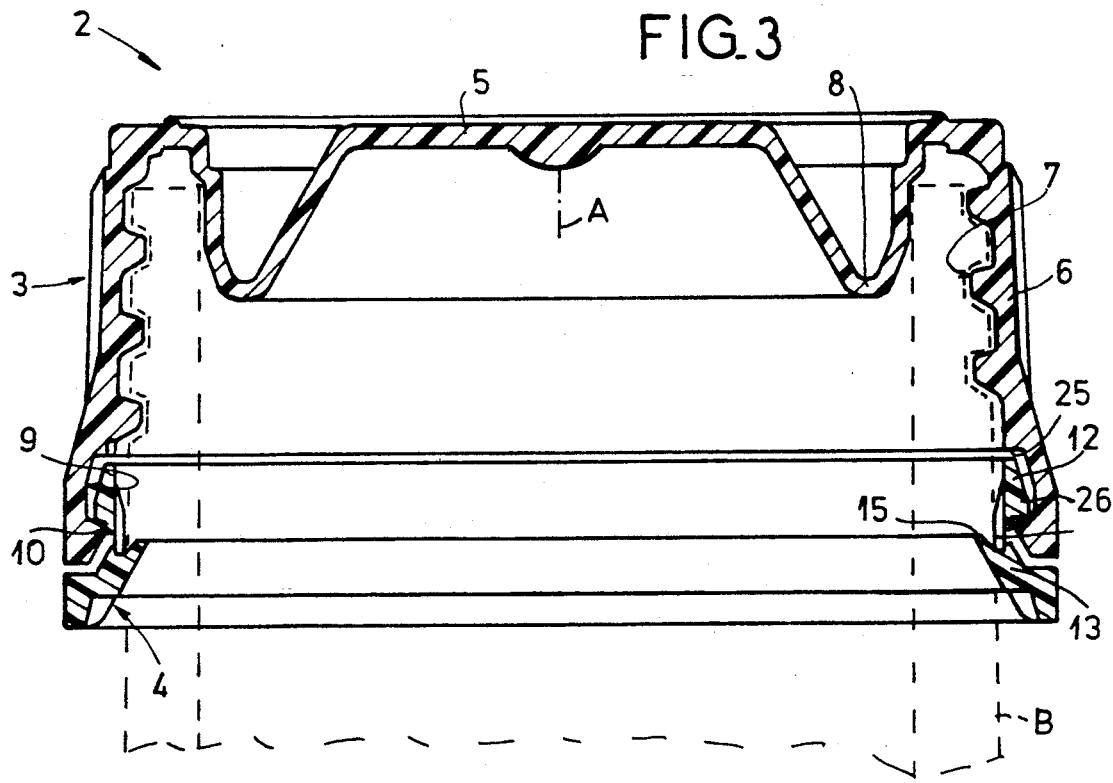
FIG. 3 is a large-scale axial section through the assembled cap and ring.

As seen in FIGS. 1, 2, and 3, a closure 2 according to this invention is constituted by a cap 3 and a tamper ring 4, both centered on a common axis A. The cap 3 is basically formed by an end 5 transverse to the axis A and an annular skirt 6 formed internally with a screwthread ridge 7. The end 5 is of uniform thickness and is formed with an axially upwardly concave annular groove 8 that acts like a plug when the cap 3 is fitted to a neck of a bottle B shown in dashed lines in FIG. 3. The skirt 6 is formed adjacent its rim or lower edge with a radially inwardly open groove 9 bounded upwardly by a continuous downwardly directed shoulder 25 and downwardly by three identical angularly equispaced and radially inwardly projecting tabs 10. The tabs 10 are each separated by spaces or lands of that facilitate demolding of the cap 3 as described below. Upward of the shoulder 25 the skirt 6 is formed internally with axially downwardly opening notches 24 that serve no function in the finished product. This cap 3 is formed unitarily of a low-density polyethylene.

The tamper ring 4 has an upper part 12 and a lower part 13 that are axially interconnected by a relatively thin and frangible web 14. The lower part 13 is formed with an inwardly projecting but upwardly angled lip 15 that is adapted to snap in a radially outwardly open square-section groove formed in the neck of the bottle B below its screwthread. The upper part 12 is formed with a radially outwardly projecting ridge 26 adapted to snap within the inwardly open groove 9 of the cap 6, and this ridge 26 has a frustoconical surface so that it can deform the cap 3 and snap in place but will not be able to pull therefrom without rupturing the web 14 once thus snapped in. The ring 4 is formed of a high-density polyethylene.

Figure 4:
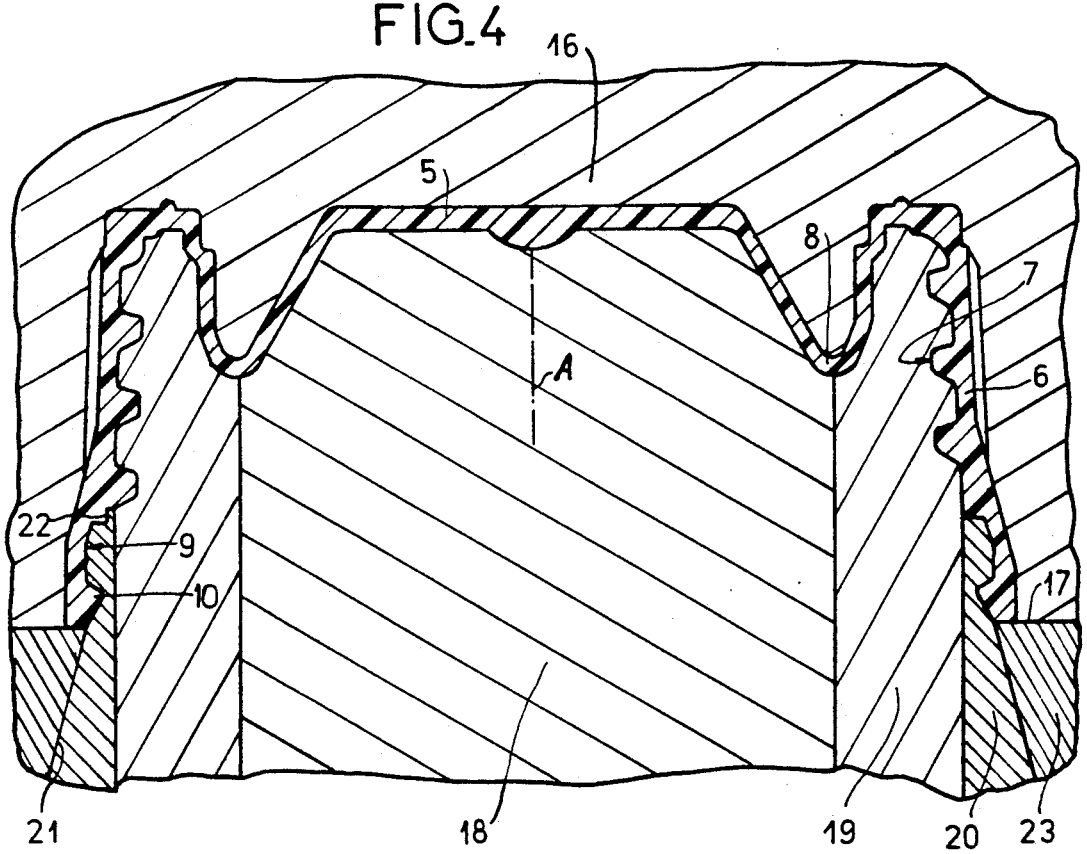
FIG. 4 is a view like FIG. 3 but showing the cap in the mold used to construct it.

FIG. 4 shows how the cap 3 is injection-molded in a mold having an outer part 16 with a shape corresponding to the outer surfaces of the end 5 and skirt 6. This outer part 16 terminates axially at a plane 17 level with the lower edge or rim of the skirt 6 and perpendicular to the axis A. The inner surface of the cover 5 inward of the lowest part of the groove 8 is formed by a mold core 18 whose outer surface is cylindrical and centered on the axis A. An externally threaded inner sleeve or tube 19 surrounds the core 18 and is used to form the inner surface of the end 5 outward of the groove 8 and the inner surface of the skirt 6, including its screw thread 7, axially upward of the shoulder 25. The sleeve 19 has below its screwthread a cylindrical outer surface and is surrounded by an outer tube or sleeve 20 having an upper end which is complementary to the groove 9 and the tabs 10 and that also is formed with an array of axially upwardly projecting teeth 22 that eventually form the notches 25. This tube 20 has an upwardly tapering frustoconical outer surface 21 complementary to the inner surface of a stripping element 23 terminating at the plane 17. The outer part 16 rests at the plane 17 on the element 23.

To make the cap 3 all of the above-described mold parts 16, 18, 19, 20, and 23 are assembled into the positions illustrated in FIG. 4 to form a cavity corresponding to the shape of the cap 3 and low-density polyethylene is injected into this cavity.

Once the resin has cured somewhat, the outer part 16 is lifted axially upward off the cap 3, something that can be done with no deformation whatsoever of this cap 3 which remains solidly held on the threaded inner sleeve 19.

Then the core 18 is retracted axially downward, and the sleeve 19 is similarly moved axially downward as it is rotated, unscrewing it from the thread 7 of the skirt 6. Rotation of the cap 3 during such rotation of the sleeve 19 is impeded by the teeth 22 fitting in the notches 25.

The stripping element 23 is then moved axially upward relative to the outer sleeve 20 or the latter is moved downward relative to the plate 23, so that the still somewhat soft cap 3 deforms slightly as the tabs 10 move upward over the outwardly projecting ridge of the tube 20. This leaves the finished cap 3 sitting on the element 23.

The invention is not strictly limited to the arrangement described above. The end 5 of the cap 3 could be differently formed, and the outer mold part 16 could be of several pieces. These and other obvious changes are all intended to lie within the scope of this invention as defined in the claims.

I claim:

1. A closure for an upwardly open annular bottle neck centered on an axis and formed with an external attachment formation and an axially downwardly projecting shoulder, the closure comprising:
    a unitary one-piece cap formed of a relatively soft synthetic resin with
        an end sealingly fittable over the neck,
        an annular skirt projecting axially from the end and formed internally with an attachment formation complementary to that of the neck, the skirt having remote from the end a rim and formed between the rim and the end with a radially inwardly open groove, the skirt being formed adjacent its rim with a plurality of angularly spaced and radially inwardly projecting tabs axially downwardly delimiting the groove of the skirt and defining radially inwardly open gaps; and a unitary one-piece tamper-resistant ring separate from the cap and formed of a relatively hard synthetic resin with an annular upper part having an outwardly projecting ridge normally seated in the groove of the skirt, an annular lower part having an inwardly projecting lip fitting axially under the shoulder of the neck, and a relatively fragile web axially joining and unitarily formed with both parts.

2. The closure defined in claim 1 wherein the attachment formations are both screwthreads.

3. The closure defined in claim 1 wherein the cap is formed of a low-density polyethylene and the ring of a high-density polyethylene.

4. The closure defined in claim 1 wherein the end is formed of generally uniform thickness and with an axially upwardly open groove forming a plug engageable in the neck.

* * * * *